June 21, 1955  H. H. STOLL  2,711,327
HANDLE OPERATED COLLAPSIBLE SHOPPING CART
Filed June 9, 1952  2 Sheets-Sheet 2
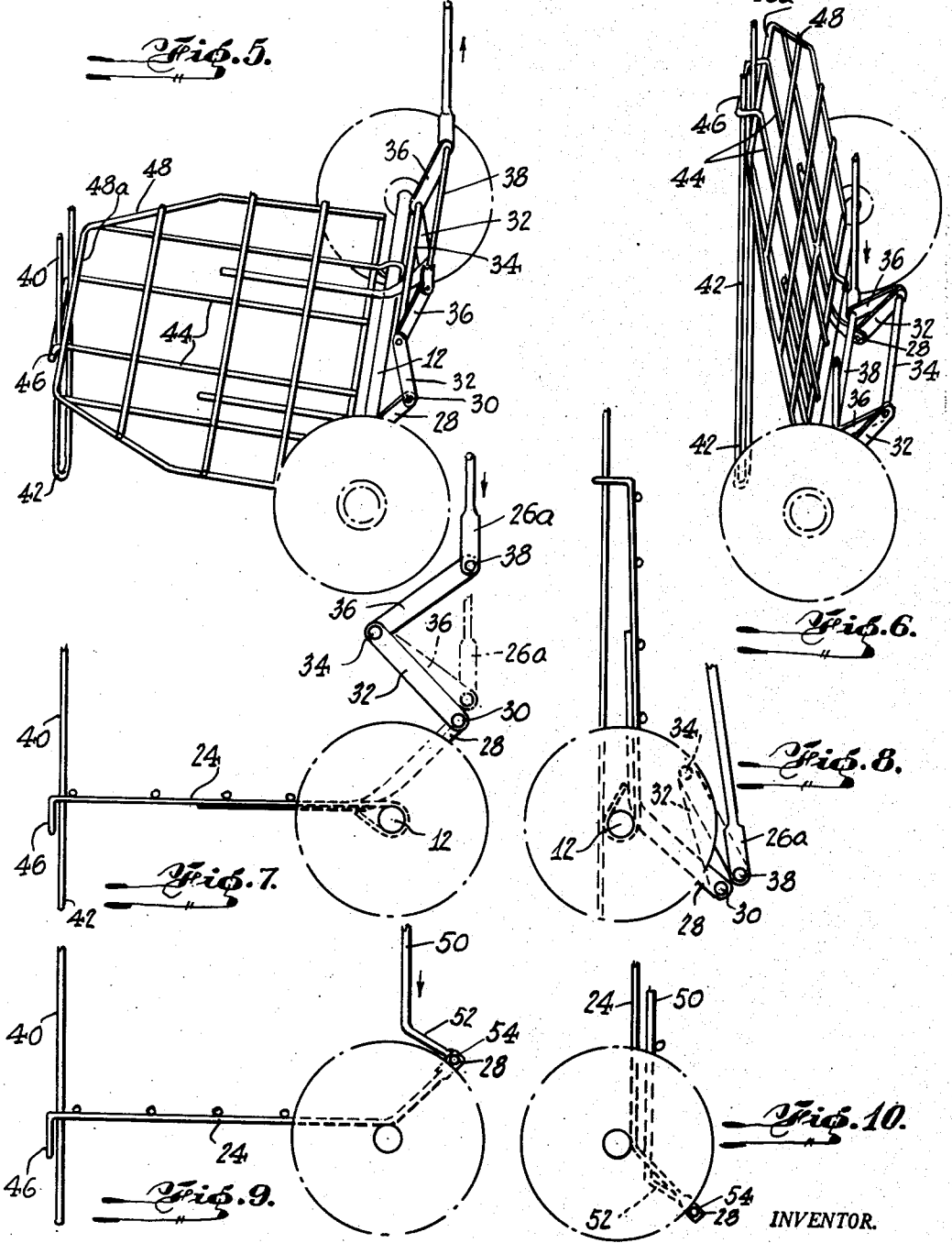
INVENTOR.
HARRY H. STOLL
BY
ATTORNEY.

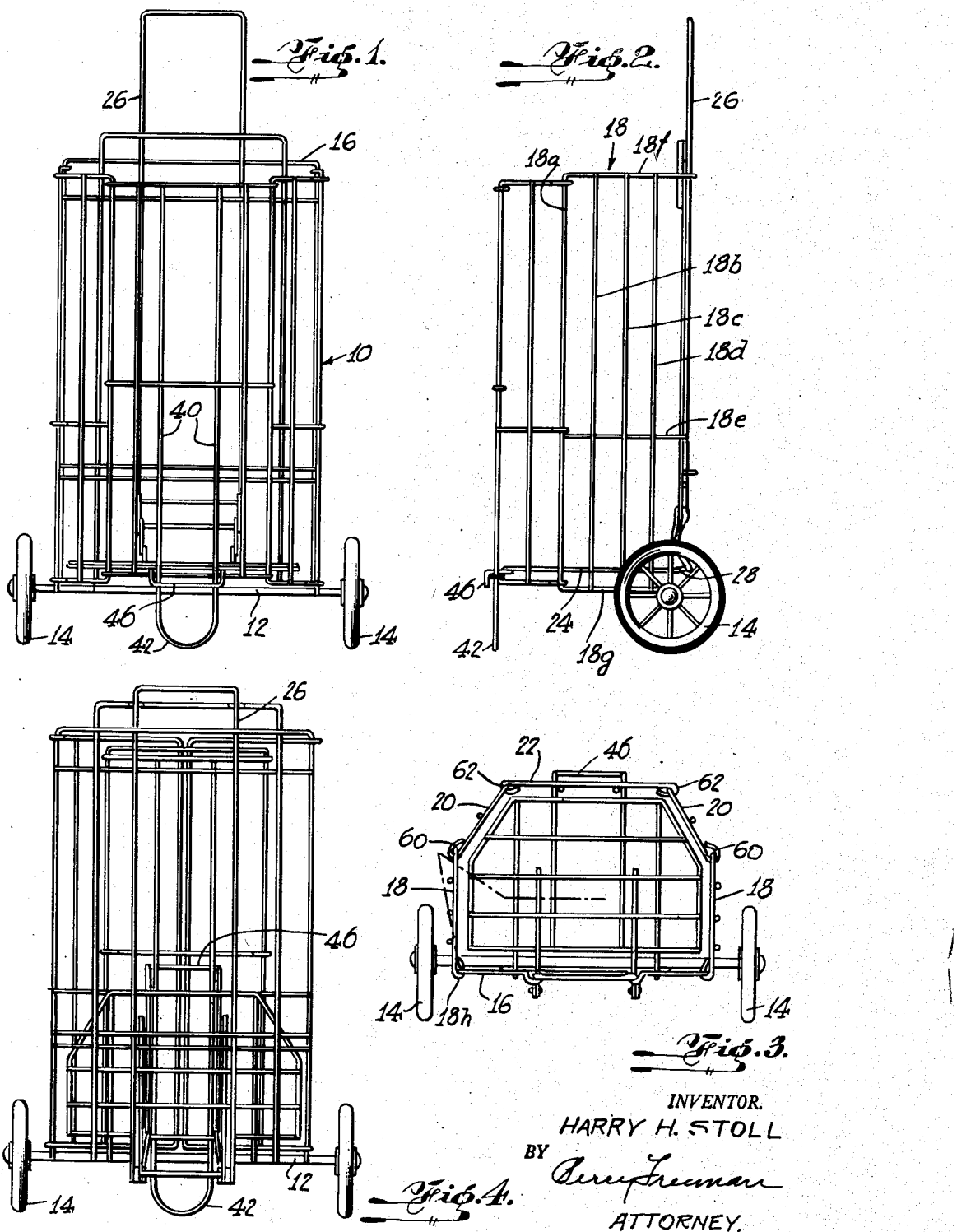

United States Patent Office 2,711,327
Patented June 21, 1955

2,711,327

HANDLE OPERATED COLLAPSIBLE SHOPPING CART

Harry H. Stoll, East Patchogue, N. Y.

Application June 9, 1952, Serial No. 292,415

2 Claims. (Cl. 280—36)

This invention relates to a collapsible shopping cart.

The principal object of this invention is the provision of a collapsible shopping cart which may be collapsed to folded condition or opened to operative condition by simply actuating the handle of said shopping cart. The shopping cart to which this invention relates includes a back frame which is mounted on an axle and wheels. It has two side frames which are pivotally mounted on the back frame member and a front frame which is pivotally mounted on the side frames. So that it may collapse to even smaller, more compact proportions, each of the two side frames consists of two frame components which are pivotally connected to each other. The floor of the shopping cart is also pivotally mounted relative to the axle and back frame, and it is connected at its back end to the shopping cart handle and at its front end to the front frame of the shopping cart. When the handle is pushed downwardly, it causes the floor of the shopping cart to tilt upwardly and against the back frame. Since it is connected at its forward end to the front frame, this same tilting action will bring the front frame inwardly toward the back frame. By the same token, since the two side frames are pivotally connected both to the back and front frames, the inward movement of the front frame will cause said side frames to fold inwardly and upon themselves, against the back frame. The shopping cart is now in collapsed or folded condition for storing or other similar purposes.

The above described process is reversed in opening the shopping cart to operative condition. The handle is pulled upwardly and the floor is thereby positively caused to tilt downwardly to horizontal position. Again, since it is connected at its front end to the front frame of the shopping cart, this downward tilting movement of the floor tends to push or thrust the front frame outwardly and away from the back frame. And since the side frame members are connected both to the back frame and the front frame, this outward or forward movement of the front frame away from the back frame will cause said side frame members to unfold and to swing outwardly to operative positions. The shopping cart is now set up and ready for use.

An important feature of this invention is its handle-actuating mechanism whereby the cart may be folded by pushing down upon the handle and unfolded by pulling up upon the handle. This is in contrast to the foot treadles of conventional shopping carts of this general description, where the foot treadles are connected to the folding mechanism and it is necessary to actuate them in order to operate said folding mechanism. The foot treadles always seem to be in the way and they are not very convenient to use. On the other hand, the shopping cart handle of the present invention is very handy and it is very convenient and easy to operate. An important advantage is the fact that when the handle is depressed to collapse the cart, the very act of depressing it tends to reduce the folded proportions of the cart. By the same token, when the handle is pulled out to open the cart, it is thereby elevated to a very convenient operative height.

A preferred form of this invention and a modified form are shown in the accompanying drawings, in which:

Fig. 1 is a front view of a shopping cart made in accordance with the first form of this invention, showing it in operative condition and ready for use.

Fig. 2 is a side view thereof.

Fig. 3 is a top view of said shopping cart.

Fig. 4 is a view of said shopping cart in collapsed condition.

Fig. 5 is a fragmentary perspective view showing the linkage between the handle and the floor of the shopping cart and also showing how said floor is connected to the front frame of the shopping cart.

Fig. 6 is a similar view showing the floor of the shopping cart tilted upwardly to collapsed position by reason of the handle having been pushed downwardly and also showing how the front frame of the shopping cart is pulled inwardly by the same action.

Fig. 7 is a fragmentary side view showing the action of the handle and the length between said handle and the floor of the shopping cart.

Fig. 8 is a view similar to that of Fig. 7, showing the handle in its lowermost position and the floor of the shopping cart tilted upwardly to vertical position, the front frame being also shown drawn inwardly to collapsed position.

Fig. 9 is a view similar to that of Fig. 7, showing a modified construction wherein the handle is connected directly to the floor of the shopping cart without the use of an intermediate linkage.

Fig. 10 is a view similar to that of Fig. 8, showing the handle of said modified cart construction in its depressed position and the floor tilted upwardly to vertical position.

Shopping cart 10 has an axle 12 mounted on wheels 14, a back frame 16 secured at its lower end to the axle, side frame members 18 which are pivotally supported by the back frame, a second pair of side frame members 20 which are pivotally mounted on the first pair of side frame members, a front frame 22 which is pivotally mounted on the second pair of side frame members 20, a floor 24 which is pivotally secured at its back end to axle 12 and a handle 26 which is slidably mounted on the back frame for vertical movement both upwardly and downwardly. A pair of arms 28 project backwardly from floor 24 and they extend across axle 12 and backwardly therefrom. These arms are curved or bent upwardly so as to form, with the floor proper, what may be described as a bell crank construction pivoted about axle 12.

Pivotally secured to the back ends of arms 28, by means of pins 30, are links 32 and pivotally secured to said links, by means of pins 34, are additional links 36. The lower ends 26a of handle 26 are pivotally secured by means of pins 38 to said additional links 36. Pins 30, 34, and 38 may extend the full width of the handle, or substantially its full width, but in the preferred form of this invention only pins 34 and 38 extend its full width, as Fig. 1 clearly shows. See also Fig. 5.

Figs. 7 and 8 show the action or movement of links 32 and 36 and handle 26 and floor 24. When the handle is moved downwardly as indicated by the arrow in Fig. 7, the links fold upon each other until they reach the interrupted line position of said Fig. 7. Elongated pin 38 now rests upon the lower ends of links 32 and the back ends of arms 28.

Further downward movement of the handle causes arms 28 and floor 24 to tilt about axle 12 to the position which they are shown to occupy in Fig. 8. The handle is now in its lowermost position and the floor is in its folded vertical position against the back frame of the shopping cart.

It will be seen that the front frame 22 is provided with a pair of upright rods 40 which are parallel to each other along the greater part of their length. They are, however, joined at their lower ends by means of a bail 42 which serves as a third support for the shopping cart when it is set up in operative condition, the other two supports being its two wheels 14. Floor 24 is also provided with a pair of parallel rods 44 and these two rods are joined at their forward ends by means of a downwardly extending loop or bight 46. The floor is also provided with a rod 48 which extends around its front and two sides, and it will be noted that the front section 48a of said rod 48 parallels bight 46 to form what may be described as an enclosure therebetween. Uprights 40 of the frame 22 slidably extend through said enclosure between bight 46 on the one hand and front section 48a of rod 48 on the other hand.

When the handle is depressed as shown in Figs. 7 and 8 to tilt the floor upwardly and backwardly, bight 46 engages the two uprights 40 of front frame 22 and pulls said front frame inwardly toward the back frame as Fig. 8 clearly shows. Since the front frame is pivotally connected to the side frame members, this inward or backward movement of the front frame causes said side frame members to fold inwardly and backwardly into collapsed or folded position. See Fig. 4.

Figs. 9 and 10 shows a variation of the construction of Figs. 7 and 8, and it will be seen that basically the difference in construction is the omission of links 32 and 36. Handle 50 shown in Figs. 9 and 10 has a pair of end pieces 52 at its lower end, extending downwardly and backwardly. These two end pieces 52 are pivotally secured to the ends of arms 28 of floor 24 by means of pins 54. When handle 50 is depressed as indicated by the arrow in Fig. 9, the floor and its two arms 28 are caused to tilt in clockwise direction as viewed in said Fig. 9 until their respective positions in Fig. 10 are attained. The floor is now folded up against the back frame of the shopping cart and the front and side frame members are also folded inwardly to collapsed positions as has above been described.

The shopping cart which is shown in the drawing is made of wire that is bent to appropriate shape and welded to be held in place. Each of the back, front and side frame members comprises a plurality of spaced, parallel, vertically extending wires or rods and a plurality of spaced, parallel, horizontal wires or rods. The vertical wires or rods are welded to the horizontal wires or rods to complete the frames. By way of illustration, side frame member 18 shown in Fig. 2 comprises vertically extending wires 18a, 18b, 18c and 18d, respectively. There is also a horizontal rod 18e which is welded to said vertical wires or rods. Similarly, rod or wire 18a is bent over at its upper and lower ends to form horizontal sections 18f and 18g to which the ends of rods or wires 18b, 18c and 18d are respectively welded. The ends of said horizontal members 18e, 18f and 18g are curled to form loops 18h which engage vertical sections of the back frame to pivotally connect said side frame members to said back frame. Similar loops 60 connect side frames 20 to side frames 18 and similar loops 62 connect the side frame members 20 to the front frame 22.

The foregoing is illustrative of preferred forms of this invention. These preferred forms may be modified and other forms may be provided within the broad spirit of the invention and the broad scope of the claims.

Having thus described my invention, what I claim as new and desire to secure by Letters Patent, is:

1. A collapsible shopping cart comprising a back section, an axle fixed to the back section at its lower end, wheels rotatably held on the ends of the axle, side sections hinged at their rear edges to the side edges of the back section, front sub-sections hinged at their rear edges to the side sections, a front center section hinged to the forward side edges of the sub-sections, and a bottom section hinged at its rear end to the axle, said bottom section having its front end slidably secured to the front center section, a lever arm fixed to the rear end of the bottom section and extending rearwardly of the back section to pivot the bottom section on the axle, a cart handle slidably secured to the back section, said handle having its lower end aligned with and operatively connected to the lever arm for raising and lowering the bottom section and collapsing and opening the shopping cart.

2. A collapsible shopping cart comprising a back frame, an axle and wheels supporting said back frame, a pair of side frame members pivotally mounted on said back frame, a front frame pivotally mounted on said side frame members, a floor pivotally connected at its back end to the axle, its front end being slidably connected to the front frame, a handle which is slidably mounted on the back frame for vertical movement in both directions thereon, and connecting means between the lower end of the handle and the back end of the floor, said connecting means comprising a pair of arms which extend backwardly from the main body of said floor on the opposite side of the axle from said main body of the floor, a link pivotally secured to each of said arms, a second link pivotally secured to said first link, and means pivotally connecting the lower end of the handle with both second-mentioned links, said second-mentioned links being foldable upon the first-mentioned links when the handle is depressed to enable said handle to engage the first-mentioned links adjacent their pivotal connections with the two arms on the floor of the shopping cart, whereby a downward movement of said handle causes a downward tilting movement of said arms and a corresponding upward tilting of said floor, toward vertical position and an inward movement of the front and side frames, and whereby an upward movement of the handle causes a downward tilting movement of the floor to horizontal position and an outward movement of the front and side frames.

References Cited in the file of this patent

UNITED STATES PATENTS

| | | |
|---|---|---|
| 2,475,797 | Martin | July 12, 1949 |
| 2,589,044 | Brodeck | Mar. 11, 1952 |